US005786044A

United States Patent [19]

Hauge

[11] Patent Number: 5,786,044

[45] Date of Patent: Jul. 28, 1998

[54] THREE-DIMENSIONAL DOOR DECORATION

[75] Inventor: Steven P. Hauge, Minneapolis, Minn.

[73] Assignee: Trend Enterprises, Inc., New Brighton, Minn.

[21] Appl. No.: 721,891

[22] Filed: Sep. 27, 1996

Related U.S. Application Data

[63] Continuation of Ser. No. 418,146, Apr. 5, 1995, abandoned.

[51] Int. Cl.$^{6}$ .......... B32B 3/10

[52] U.S. Cl. .......... 428/8; 428/99; 428/542.6; 428/904.4; 52/212

[58] Field of Search .......... 428/7, 8, 99, 542.6, 428/904.4; 52/211, 212

[56] References Cited

U.S. PATENT DOCUMENTS

| | | | |
|---|---|---|---|
| 2,579,943 | 12/1951 | Marchand | 52/212 |
| 3,778,945 | 12/1973 | Medow | 52/211 |
| 4,389,824 | 6/1983 | Anderson | 52/212 |
| 4,765,006 | 8/1988 | Jackson et al. | 5/508 |
| 4,791,740 | 12/1988 | Ferrari | 40/124 |

*Primary Examiner*—Alexander Thomas
*Attorney, Agent, or Firm*—Merchant, Gould, Smith, Edell, Welter & Schmidt

[57] ABSTRACT

A three-dimensional doorway decoration is disclosed which may contain graphic illustrations and text corresponding to a particular educational theme. The doorway decoration includes a header assembly having left and right header pieces that are adjustably connected as a function of the doorway width, and a title component that interconnects with each of the header pieces and overlies the juncture thereof. The doorway decoration also includes left and right side assemblies mounted to each side of the doorway and extending downward from the header assembly. Each side assembly preferably includes upper and lower side pieces that are mounted in overlapping relation. Standoff means are associated with the header assembly and the side assemblies so that the upper and outer edges thereof are spaced from the surrounding wall structure, producing a slanted, three-dimensional visual effect. The door decoration may also include various three-dimensional accessory components to provide additional visual effects.

26 Claims, 3 Drawing Sheets

THREE-DIMENSIONAL DOOR DECORATION

This is a Continuation of application Ser. No. 08/418,146, filed Apr. 5, 1995, abandoned.

The invention broadly relates to a three-dimensional decorative device intended to enhance the appearance of a rectangular area, such as a doorway, window or portion of a wall.

In the broad sense, products intended for the purpose of decorating a doorway or other similar area are not generally known. Traditionally, internal and external doorways have been provided with wooden trim that is custom fitted to a doorway, and plastic molded components are available in kit form to the building trade to give a desired architectural appearance to an external doorway. However, it is believed that no product exists in the prior art that has as its specific purpose the use of materials in two-dimensional form that may be used on a non-permanent basis to decorate a doorway or similar area.

In a more specific context, teachers use a wide variety of graphic and textual materials throughout the classroom that assist in educating students as well as providing a pleasant teaching environment. For example, bulletin board sets that decorate and trim bulletin boards are commonly used, and various types of educational materials may be used around blackboards, windows and even doorways. Generally such materials are custom made by the teacher to emphasize a particular theme or subject, as well as to conform to the unique configuration and dimensional requirements of the classroom. While such materials may be adapted by the teacher to decorate a doorway or other rectangular area, there is not believed to be any product available that can decoratively transform a doorway or other area without considerable effort and custom design, and in particular a product that provides a three-dimensional visual appearance to the doorway.

Broadly, the invention consists of a multi-component device that enables a user to quickly and easily decorate a doorway, window or other rectangular area, which may be easily adjusted to such areas that differ in size, and which provides a three-dimensional appearance.

As specifically disclosed, the invention consists of a multi-component decorative decor that transforms a classroom entry way to an area that is not only decorative but educational as well. Several components of the decor uniquely interrelate to accommodate doorways of differing size while producing a three-dimensional effect that attracts the attention of students and at the same time enhancing the classroom environment. The three-dimensional decorative doorway may be produced in a wide variety of decorative motifs, enabling the teacher to select a particular style corresponding to a selected subject or season of the year.

The inventive three-dimensional door decoration includes a number of components that are individually assembled and easily mounted to the doorway. Specifically, the preferred embodiment includes left and right side assemblies which preferably include upper and lower side pieces on each side of the door. The upper side piece includes a tapered standoff along its outer edge that results in a tapered, three-dimensional effect when mounted. The upper and lower side pieces are longitudinally configured and vertically mounted, preferably in overlapping relation. It is possible to form the side assemblies from a single member.

A header assembly in the preferred embodiment consists of left and right hand header pieces that are adjustably assembled to accommodate doors of varying width. A pair of tabs on one of the header pieces are inserted into a selected pair of a plurality of slot pairs to determine the width of the header assembly. A title component then overlies the juncture of the header pieces, and is constructed to adjustably slide to a centered position before securing. The title component includes standoff structure to produce a three-dimensional effect relative to the header pieces. Further, the upper edge of the header pieces also include standoff structure to space it from the supporting wall surface, whereas its lower horizontal edge is secured flush to the door jamb to produce a tapered, three-dimensional effect.

A wide variety of three-dimensional accessory components are attachable to the primary components of the door to highlight or emphasize in various manners particular aspects or features of the subject matter of the decor.

While the inventive three-dimensional decoration is shown in conjunction with an internal doorway, it can be used for other passageways (e.g., external doorways or windows), or simply to decorate a rectangular area (e.g., a portion of a wall). The term "passageway" as used herein is intended to encompass all such examples and any other area or region suitable for decoration. Further, in addition to classroom use, the inventive decoration may be used in homes, businesses, churches and in a variety of other locations where decoration is desirable.

DESCRIPTION OF THE PREFERRED EMBODIMENT

Figure 1:
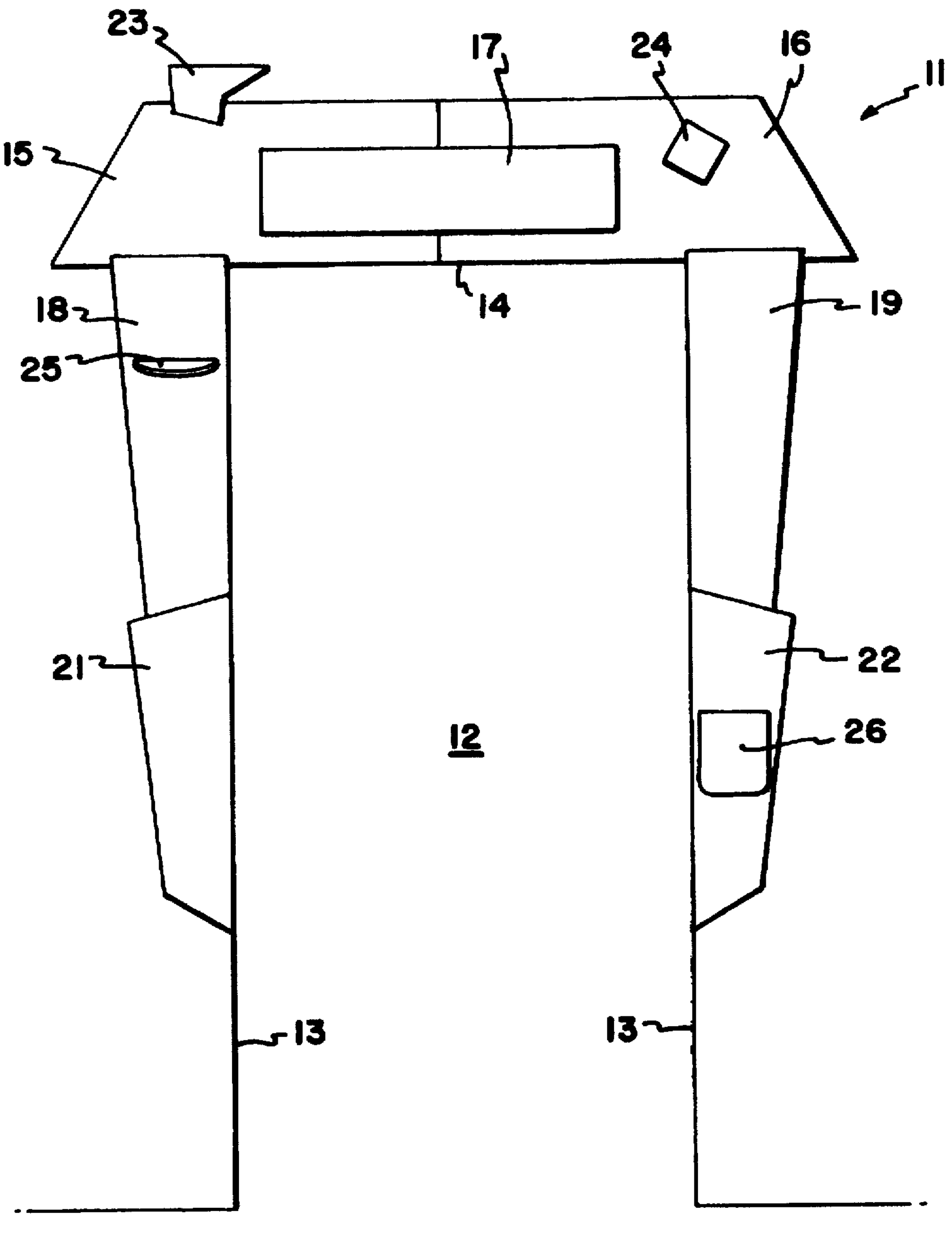
FIG. 1 is a front elevational view of a three-dimensional door decoration embodying the invention showing all of the components in an assembled position.

With initial reference to FIG. 1, a three-dimensional door decoration is represented generally by the numeral 11. Door decoration 11 is disclosed in conjunction with a conventional internal doorway 12, which includes side jambs and a top jamb 14. Door decoration 11 may also be utilized to decorate an external door, windows or any other passageway, or any rectangular area such as a portion of a wall. The inventive door decoration 11 is mountable on doors of any size and is adaptable to doorways with (FIG. 4) or without conventional molding trim.

It is to be emphasized that the three-dimensional door decoration 11 as shown in the Figures is structurally generic to a number of specific embodiments in which the appearance of the structural components themselves, and even their external shape or configuration, may vary depending on the decorative purpose desired, which is a classroom setting may include an educational purpose as well. For example, the overall decorative motif may pertain to one of the seasons, rain forests with different types of vegetation and animal life, outer space, oceans and under water animal life, or dinosaurs. In each of these cases, each of the components described below is configured and graphically printed to portray the exemplary motif, and specific examples will be discussed throughout the specification. However, from the structural standpoint, since the graphic illustrations and configurations vary from embodiment to embodiment, the various components in FIGS. 1–5 are shown in generic form and without graphic illustrations or depictions.

Figure 2:
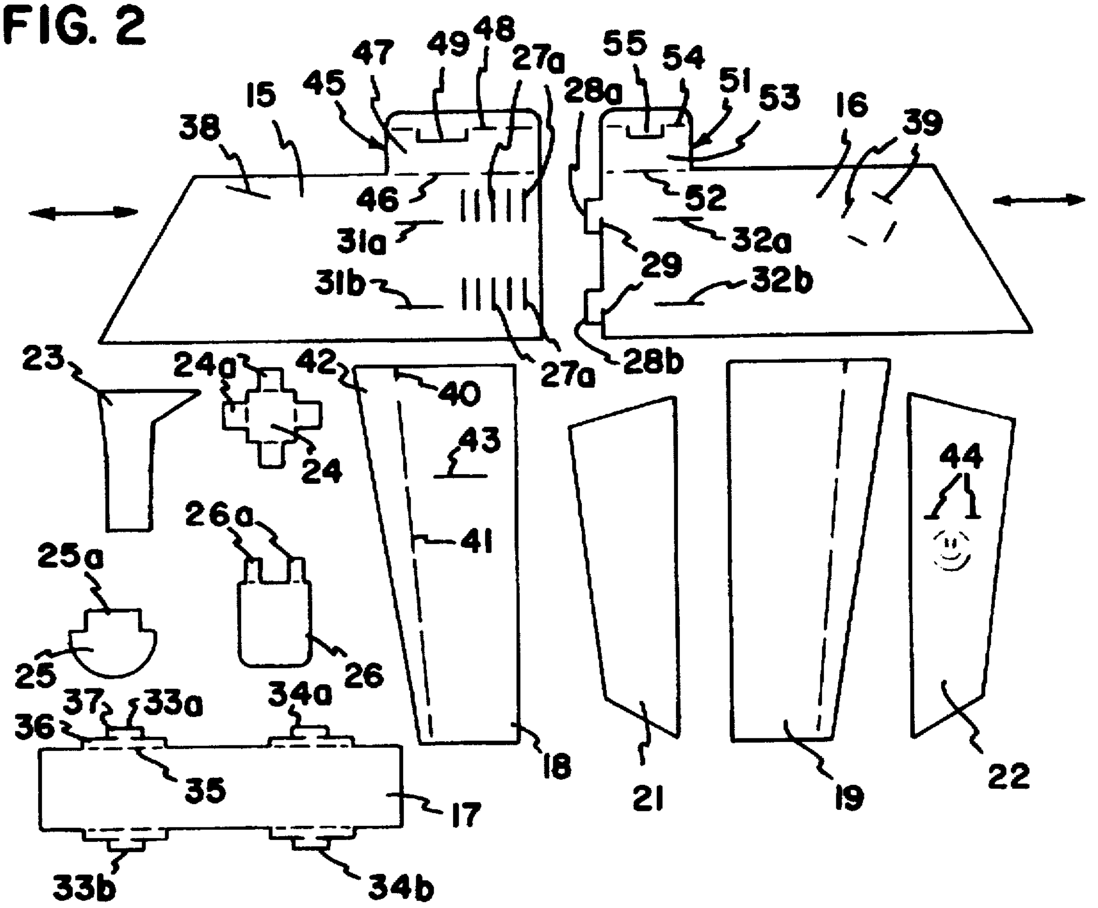
FIG. 2 is a front elevational view of each of the components of the three-dimensional door decoration prior to assembly.

With continued reference to FIGS. 1 and 2, the preferred embodiment of the 3-dimensional door decoration 11 specifically comprises first and second (left and right) header pieces 15, 16, a title component 17, an upper left hand side piece 18, an upper right hand side piece 19, a lower left hand side piece 21 and a lower right hand side piece 22. In addition, a variety of three-dimensional accessory components 23–26 may be used with the door decoration 11. Each of these components is preferably formed from material that is substantially two dimensional; e.g., paperboard or cardboard.

With specific reference to FIG. 2, the header pieces 15, 16 are generally elongated, each defining an upper edge, and right and left ends. The header pieces 15, 16 are constructed in such a manner that they may be adjustably assembled to span doorways of varying width. As shown in FIG. 1, it is preferable that the assembled header pieces 15, 16 extend laterally outward of the side jambs of doorway 12 by a considerable amount to overly the upper left hand and right hand side pieces 18, 19.

To accomplish the desired width, left header piece 15 is provided with a plurality of paired, vertically oriented slots *27a*, *27b* with each slot pair being vertically spaced from each other. In the preferred embodiment, five such paired slots are formed in the left header piece 15 toward its right end with the overall spacing range of these paired slots sufficient to accommodate doorways of varying width. Preferably, the slot pairs *27a*, *27b* are laterally or horizontally spaced at one inch spaced intervals, and indicia (not shown) may be printed adjacent the slots *27a*, *27b* to indicate the doorway width which is to be accommodated (e.g., 36 inches-40 inches).

The right header piece 16 is constructed with a pair of tabs *28a*, *28b* at its left end which are constructed and disposed to be selectively inserted into one of the paired slots *27a*, *27b*. Each of the tabs *28a*, *28b* has a partial cut 29 extending upward from its bottom edge, enabling the left and right header pieces to be relatively vertically adjusted after the tab insertion so that both pieces are aligned along their respective bottom edges.

A pair of horizontally disposed slots *31a*, *31b* are formed in left header piece 15 adjacent the slot pairs *27a*, *27b*. A similar pair of horizontal slots *32a*, *32b* are formed in the right header piece 16 adjacent and to the right of the paired tabs *28a*, *28b*. These four slots are constructed and disposed to receive the title piece 17.

Figure 3:
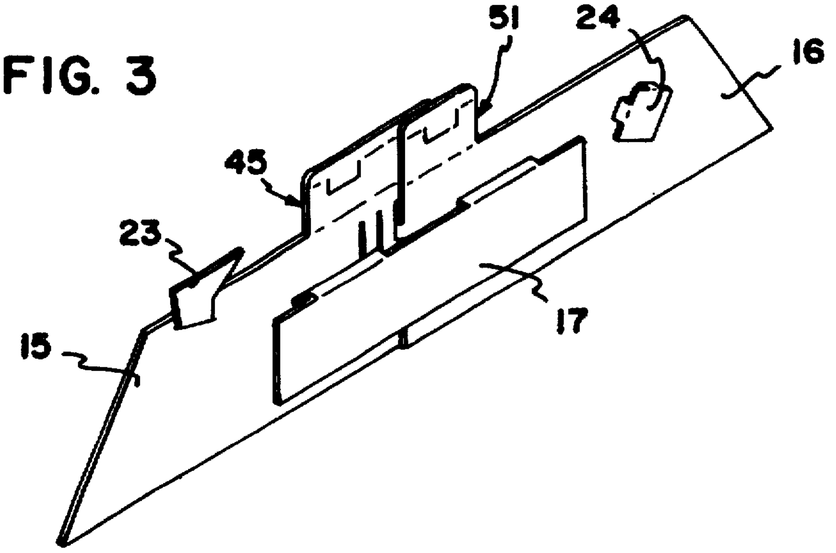
FIG. 3 is a perspective view of the partially assembled header components of the three-dimensional door decoration.

With reference to FIGS. 2 and 3, title piece 17 is formed with a left hand pair of tabs *33a*, *33b* and a right hand pair of tabs *34a*, *34b*. These tabs are structurally identical, and a description of one is exemplary of all.

Tab *33a* is bendable along a line 35 and includes a standoff member 36 having a width greater than the associated slot *31a* and an insertable tab portion 37 that is of lesser width than the associated slot *31a* and which is provided with partial cuts along each side. The horizontal length of the slots *31a,b*, *32a,b* is sufficient to accommodate the tabs *33a,b*, *34a,b*, notwithstanding the adjustable width of the header as determined by the selected slot pairs *27a,b* and insertable tabs *28a,b*. With the header pieces 15, 16 in assembled relation, the insertable portions 37 of tabs *33a,b*, *34a,b* are inserted into the associated slot pairs *31a,b*, *32a,b*, and the title piece 17 is then slid to the right or left to center it. The standoff member 36 of the tabs *33a,b*, *34a,b* causes the title piece 17 to be spaced from the header pieces 15, 16, giving a three-dimensional effect. The title piece 17 preferably includes a title of the decorative motif; e.g., "Autumn", "Space" or "Dinosaurs".

It is possible to locate the tab-slot combinations differently, or to utilize different tab-slot configurations on title piece 17. While the title piece 17 is preferably spaced from the header pieces 15, 16 as shown, this is not essential to the invention.

Header pieces 15, 16 may also be constructed to include some of the three-dimensional accessory components. Specifically, and with continued reference to FIGS. 2 and 3, header piece 15 includes an angled slot 38 to receive the accessory component 23, the lower portion of which defines a tab that fits into the slot 38. Preferably, when assembled, the upper or head portion of accessory component 23 projects above the header piece 15 as shown in FIG. 3. Graphically, the accessory component 23 may depict a dinosaur head, a part of a tree or other plant, the wing of a bird or any other depiction consistent with the decorative motif.

In a similar manner, right hand header piece 16 is provided with a group of slots 39 arranged in a square configuration and adapted to receive four bendable tabs *24a* of the accessory component 24. Preferably, and as shown in FIG. 3, the bent tabs *24a* are only partially inserted into the slots 39 so that the component 24 stands away from the header piece 16 giving a three-dimensional impression. Depending on the decorative motif of the door decoration 11, the accessory component 24 may depict a butterfly, a bird, a flower or the like.

Figure 4:
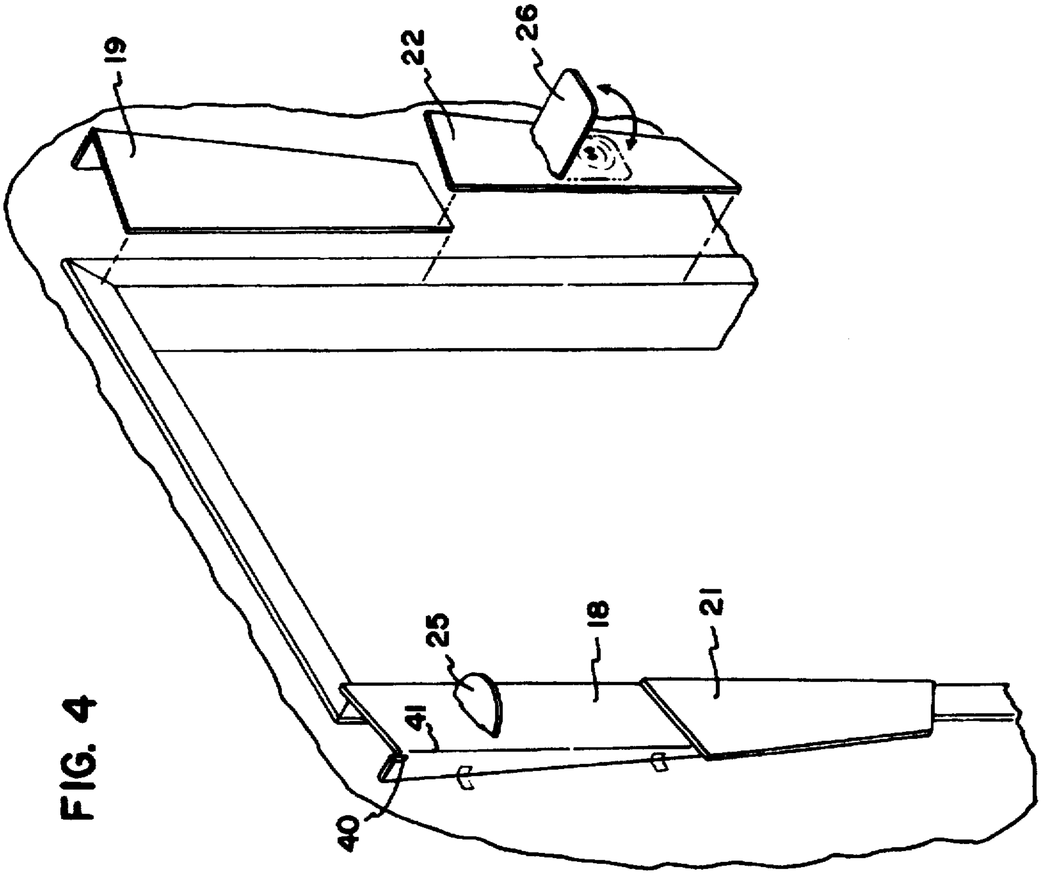
FIG. 4 is a fragmentary perspective view of the side components of the three-dimensional door decoration assembled and being mounted.

The upper left and right side pieces 18, 19 are substantially symmetrically identical although they may vary in shape depending on the decorative motif, and a description of one will suffice. The side piece 18 is generally trapezoidal in configuration, being wider at the top than the bottom with a right hand edge that can be vertically oriented to be aligned with the side jamb 13 of doorway 12. The left hand edge of upper side piece 18 is skewed or angularly disposed to the right hand edge. An angular bend line 41 extends from the top to the bottom, and as best shown in FIG. 4, the bend line 41 defines an elongated trapezoidal tab 42 the edge of which rests against the wall surface adjacent doorway 12. A vertical slot 40 is formed at the extreme top of bend line 41 for a purpose described below.

Because it is trapezoidal, the upper end of side piece 18 stands away from the wall surface by a greater amount than the lower end, and when mounted gives a slanted, three-dimensional appearance the slant of which diminishes from top to bottom.

Upper side piece 18 is also formed with a horizontal slot 43 that receives an insertable tab *25a* of the accessory component 25. The component 25 may be inserted to lie flat against the side piece 18, or may be disposed at an angle or perpendicular to the side piece 18 depending on the effect desired. Graphically, it may depict a flower, a portion of an animal, a clothing component, part of a planet or the like.

The lower left hand and right hand side pieces 21, 22 are also substantially symmetrically identical. Each is generally elongated with an inside edge that can be vertically aligned to the side jambs 13 and an outer edge that is tapered generally in conformance to the outer edge of the side pieces 18, 19. The upper end of the lower side pieces 21, 22 may be identical to the width of the lower end of the side pieces 18, 19 to continue the external tapered line, but as shown particularly in FIG. 1, may also be wider depending on the decorative motif desired.

In the preferred embodiment, the side pieces 21, 22 do not include structure that causes them to stand away from the surrounding wall surface, although such a standoff is within the scope of the invention. However, because the upper end of the side pieces 21, 21 overlap and are supported by the lower end of the associated side pieces 18, 19, there is a small amount of standoff of lower size pieces 21, 22 at their upper ends. This standoff diminishes to a point of flush wall engagement at the lower end of side pieces 21, 22.

With reference to FIGS. 1, 2 and 4, the lower right side piece 22 is provided with a pair of horizontal slots 44 to receive the spaced insertable tabs 26*a* of the accessory component 26. Tabs 26*a* bend relative to the main body of accessory component 26 in such a way that the main body forms a liftable flap that normally overlies an underlying illustration on the side piece 22. For example, the underlying illustration may be a depiction of something that is normally hidden from view, such as a bear den or a beaver dam lodge.

The various components are preferably formed by pre-printing the various graphic illustrations on large sheets of heavy paperboard or cardboard (not shown) and die cutting the sheets to define the various components. The various components may be advantageously packaged in one or more parent sheets, with the end user punching out each component at the time of assembly.

In the assembly and mounting procedure of door decoration 11, the width of the doorway 12 is first determined, and the header pieces 15, 16 are assembled based on this width, inserting the tabs 28*a,b* into the slot pair 27*a,b* corresponding to the door width. The pieces 15, 16 are then relatively adjusted in the vertical sense so that their bottom edges are in horizontal alignment. Preferably, tabs 28*a,b* are then taped to the back surface of header piece 15 with cellophane or masking tape.

Three-dimensional accessory components 23, 24 are then assembled by insertion of their tabs into the associated slots 38, 39, followed by taping the inserted tabs to the back side of the header pieces 15, 16. For the accessory component 24, to accomplish a standoff, 3-dimensional effect, its tabs are bent perpendicular and partially inserted into the slots 39. The portion of the inserted tab is then bent flat against the back surface of the header piece 16, and optionally may be taped into place.

The title component is mounted on the assembled header pieces 15, 16. This is accomplished by bending the tabs 33*a,b*, 34*a,b* along the bend lines 35 and inserting the tab portions 37 into the associated slots 31*a,b*, 32*a,b* with the edges of the standoff portions 36 resting against the face of the header pieces 15, 16. By virtue of the width of the horizontal receiving slots, the title component 17 may be slid to the right or left to center it relative to the overall assembly. When its proper position is obtained, the insert tabs 37 are bent against the back surfaces of the header pieces 15 to prevent them from being pulled back through the slots 31. The title component 17 is spaced from the header pieces 15, 16 by the standoff tabs 36 leaving a three-dimensional effect.

The next step is to assemble and mount the upper side pieces 18, 19. First, the accessory component 25 is assembled by inserting its tab 25*a* into the slot 43. The tab 25*a* may optionally be taped to the rear surface of upper side piece 18. As indicated above, the main body portion of accessory component 25 may lie flat against the front face of side piece 18, or it may angularly or perpendicularly project therefrom depending what it graphically depicts.

Each of the upper side pieces 18, 19 is then folded along the skewed bend lines 41. As shown in FIG. 4, each side piece is mounted to the doorway 12 by aligning its inside edge to the associated side jamb 13 and with its upper edge approximately one-half inch above the level of the top door jamb 14. The tapered or trapezoidal tabs 42 are then folded back to space the outside edges of the side pieces 18, 19 from the wall surface. As shown, this causes the side pieces 18, 19 to stand away from the wall surface along the outside edge thereof but in a decreasing manner so that the standoff is greater at the top than at the bottom. The inside and outside edges of each of the pieces 18, 19 are then secured to the side jambs 13 and wall surface, respectively, as by taping.

The lower side pieces 21, 22 are then assembled and mounted. Initially, the accessory component 26 is assembled to the right hand lower side piece 22 by inserting its tabs 26*a* into the associated slots 44. Optionally, the tabs 26*a* may be taped to the back surface of side piece 22. The inner edges of the lower side pieces 21, 22 are aligned with the associated side jambs of doorway 12, and each is vertically placed so that its upper end overlaps and hides the bottom of the associated upper side pieces 18, 19 as indicated above, the upper end of side pieces 21, 22 stands away from the wall surface a small amount by virtue of its support by the lower end of the associated side pieces 21, 22. The lower side pieces 21, 22 are then taped to the wall from the rear faces. Tape having adhesive on both sides may be used, or conventional tape may be doubled or looped to accomplished this purpose.

At this point, the side components are assembled and mounted as shown in FIG. 4. The final step is mounting the header assembly in FIG. 5.

As indicated above it is possible to form the side assemblies from a single elongated member rather than upper and lower side pieces. A single side tab can provide diminishing or uniform standoff as desired.

To accomplish a three-dimensional slanted effect, the header piece 15 is provided with a large, upwardly projecting flap 45 at its right or center end (FIGS. 2 and 3). This flap is folded rearwardly along a first bend line 46 to define a standoff portion 47, and the outer portion is then folded downwardly relative to a bend line 48 that includes a die cut tab 49. The tab 49 projects upward when the outer portion of the flap 45 is folded along bend line 48. With the flap 45 folded as shown in FIG. 5, the standoff portion 47 spaces the upper edge of the header piece 15 away from the wall surface, and the upstanding tab 49 is taped to the wall surface for stability.

Header piece 16 includes a similar upstanding tab 51 with a first bend line 52, a standoff portion 53, a second bend line 54 and an upstanding tab 55 (FIGS. 2 and 3). As shown in FIG. 5, the standoff portions 47, 53 are preferably taped together for additional stability.

Figure 5:
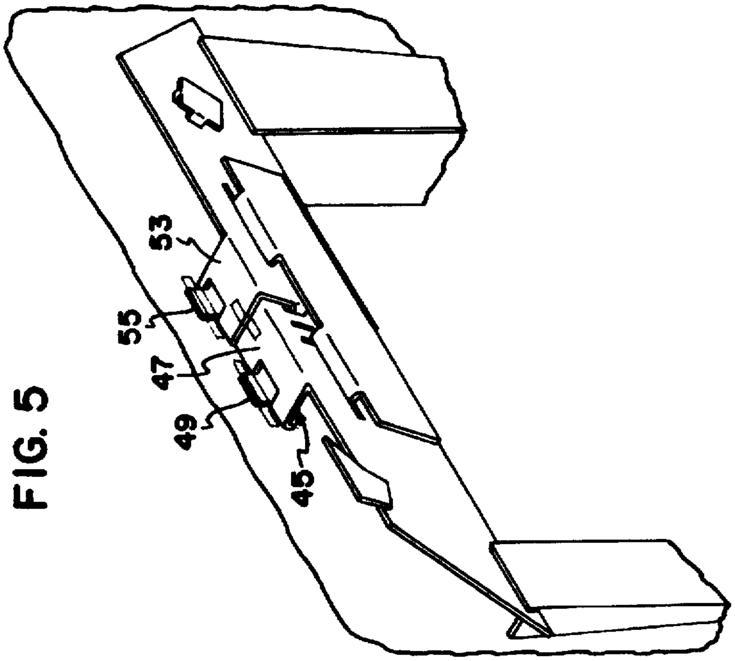
FIG. 5 is a fragmentary perspective view of the header component of the three-dimensional door decoration assembled and being mounted.

In its assembled form, the header assembly is lifted into place as shown in FIG. 5. Its extreme ends are placed in the slots 40 of side pieces 18, 19 so that the upper ends of these side pieces overlie the front face of the header assembly in the adjacent region. This provides a stable support for the header assembly. Its lower edge is then aligned with the top jamb 14 of doorway 12, and its rear or inner face along the lower edge is secured to the wall (or door trim) by tape that has adhesive on both faces or by doubled or looped single face tape. With the lower portion of the header assembly secured, the upstanding tabs 49, 55 are taped to the wall surface as shown in FIG. 5 to complete the mounting.

It will be appreciated that the appearance of the doorway is enhanced not only by the decorative graphic depiction printed on the various components, but also by the various three-dimensional aspects of the door decoration 11. In particular, the full standoff of the upper edge of the header assembly and the tapered or diminished standoff of the side pieces from the top to the bottom produces a strong three-dimensional visual effect that can be further enhanced by the various three-dimensional accessory components.

What is claimed is:

1. An adjustable three-dimensional decoration for an area of predetermined width defined by a top and left and right sides, comprising:

a header assembly mountable at the top and spanning the width of the area;

left and right side assemblies mountable to the left and right sides of the area and extending downwardly from the header assembly;

the header assembly comprising:

left and right header pieces each of predetermined width with the combined width exceeding the width of the area;

adjustable connection means associated with said left and right header pieces for adjustably connecting said header pieces together in side-by-side relation with the combined assembled width thereof chosen as a function of the width of the area, the adjustable connection means comprising tab means associated with one of said left and right header pieces, and a plurality of slot means associated with the other of said left and right header pieces, each of said slot means being constructed and arranged to connectably receive said tab means permitting the tab means to be connectably inserted into a selected slot means.

2. The adjustable decoration defined by claim 1, wherein the tab means comprises a pair of spaced tabs projecting laterally from the correcting end of said one header piece, and said slot means comprises a plurality of slot pairs disposed proximate the correcting end thereof, the slots of each slot pair being disposed to receive said pair of tabs, and the plurality of slot pairs being laterally spaced from each other.

3. The adjustable decoration defined by claim 2, wherein the tabs are substantially vertically spaced, and the slots of each slot pair are correspondingly substantially vertically spaced.

4. The adjustable decoration defined by claim 3, wherein the slot pairs are horizontally spaced at about one inch intervals.

5. The, adjustable decoration defined by claim 1, wherein the header assembly further comprises a title component having a width sufficient to span the juncture between said assembled left and right header pieces, and mounting means for mounting the title component to the assembled header pieces in overlying relation to the juncture therebetween.

6. The adjustable decoration defined by claim 5, wherein each of said left and right side assemblies, said left and right header pieces and said title component are formed from material that is substantially two-dimensional.

7. The adjustable decoration defined by claim 5, wherein the mounting means for the title component comprises standoff means for spacing the title component from said header assembly to effect a three-dimensional effect.

8. The adjustable decoration defined by claim 5, wherein the mounting means comprises a plurality of tab means disposed in spaced relation on said title component, and a like plurality of slot means disposed in said header assembly to receive said tab means.

9. The adjustable decoration defined by claim 5, wherein the mounting means comprises first and second pluralities of tab means respectively disposed on the left and right ends of the title component, and first and second like pluralities of slot means respectively disposed on the left and right header pieces to respectively receive the first and second pluralities of tab means.

10. The adjustable decoration defined by claim 9, wherein each of said tab means comprises:

a standoff member to space the title component from the header assembly, the standoff member being larger than the associated slot means to prevent its insertion therein;

and a tab member projecting from the standoff member, the tab member being sized for insertion into the associated slot means.

11. The adjustable decoration defined by claim 10, wherein each slot means is generally horizontally disposed and horizontally wider than the associated tab member to permit slidable horizontal adjustment of the associated tab member therein, whereby said title component can be slidably centered with respect to said header assembly.

12. The adjustable decoration defined by claim 1, which further comprises accessory component means for producing a contrasting three-dimensional visual effect, and means for mounting said accessory component means on a selected component of said left and right header pieces and said left and right side assemblies.

13. The adjustable decoration defined by claim 12, wherein the accessory component means comprises a body member constructed to project beyond the selected component, and the mounting means comprises tab means formed on said body member and slot means formed in said selected component.

14. The adjustable decoration defined by claim 13, wherein said tab means is constructed and arranged to space the body member from said selected component.

15. The adjustable decoration defined by claim 13, wherein the body member comprises a flap, and said flap and tab means are bendably joined.

16. The adjustable decoration defined by claim 12, wherein each of said accessory component means is formed from material that is substantially two-dimensional.

17. A three dimensional decoration for an area on a surface, the area being of predetermined width and defined by a top and left and right sides, comprising:

a header assembly comprising a flexible, substantially two-dimensional planar member mountable at the top and spanning the width of the area, the planar member defining upper and lower edges with the lower edge thereof being mountable to the surface along the top of said area, the header assembly further comprising header standoff means associated with the upper edge of said planar member for spacing said upper edge from the surface surrounding the area, whereby the header assembly produces an inwardly slanted, three-dimensional visual effect over the width thereof; and left and right hand side assemblies each comprising a flexible, substantially two-dimensional planar member mountable along the left and right sides of area, each of said planar members defining inner and outer edges with the inner edge thereof being mountable along the associated side of said area, each side assembly further comprising side standoff means associated with said outer edge of the planar member for spacing said outer edge from the surface surrounding the area at least in part, said side standoff means being greater at the top than at the bottom of said side assembly, whereby each side assembly produces an inwardly slanted, three-dimensional visual effect over at least a portion of the length thereof.

18. The three-dimensional decoration defined by claim 17, wherein each of said assemblies comprises an upper side member and a lower side member, and the side standoff means is associated only with said upper side member.

19. The three-dimensional decoration defined by claim 18, wherein the upper end of said lower side member is mounted in overlapping relation to the lower end of the upper side member, and the lower end of said lower side member is mountable directly to the surface surrounding said area.

20. The three-dimensional decoration defined by claim 17, wherein the header assembly defines left and right ends each of which extends beyond the associated side, a substantially vertical slot is formed in the top edge of each of the side assemblies and each of said ends of the header assembly is inserted into one of said vertical slots so that the side assemblies provide partial support to the header assembly.

21. The three-dimensional decoration defined by claim 17, wherein the header assembly comprises left and right header members each defining upper and lower edges, and adjustable connection means associated with the left and right header members for adjustably connecting said header members together in side-by-side relation with the combined width thereof chosen as a function of the width of said area.

22. The three-dimensional decoration defined by claim 21, wherein the header standoff means comprises left and right standoff members associated with the left and right header members, respectively, each standoff member being connected to and projecting rearwardly from said upper edge.

23. The three-dimensional decoration defined by claim 22, wherein each of said left and right standoff members comprises a flat member projecting from the upper edge of the associated header member and rearwardly bendable with respect thereto.

24. The three-dimensional decoration defined by claim 23, wherein each standoff member further comprises a tab member projecting from the associated flap member and bendable relative thereto to lie in facing relation to the surrounding wall member.

25. An adjustable three-dimensional decoration for an area of predetermined width defined by a top and left and right sides, comprising:

a header assembly mountable at the top and spanning the width of the area;

left and right assemblies mountable to the left and right sides of the area and extending downwardly from the header assembly;

the header assembly comprising:

left and right header pieces each of predetermined width with the combined width exceeding the width of the area;

adjustable connection means associated with said left and right header pieces for adjustably connecting said header pieces together in overlapping relation with the combined assembled width thereof chosen as a function of the width of the area;

the left and right assemblies each comprising an upper side piece and a lower side piece mounted in overlapping relation.

26. A three-dimensional decoration for an area on a surface, the area being of predetermined width and defined by a top and left and right sides, comprising:

a header assembly mountable at the top and spanning the width of the area, the header assembly defining upper and lower edges with the lower edge thereof being mountable to the surface along the top of said area, the header assembly further comprising header standoff means associated with said upper edge for spacing said upper edge from the surface surrounding the area, whereby the header assembly produces and inwardly slanted, three-dimensional visual effect over the width thereof; and left and right side assemblies mountable along the left and right sides of said area, each of said left and right side assemblies defining inner and outer edges with the inner edge thereof being mountable along the associated side, each side assembly further comprising side standoff means associated with said outer edge for spacing said outer edge from the surface surrounding the area at least in part, and said side standoff means is greater at the top than at the bottom of said side assembly to produce an inwardly slanted, three-dimensional visual effect over at least a portion of the length thereof.

* * * * *